Patented Sept. 12, 1944

2,358,191

UNITED STATES PATENT OFFICE 2,358,191

TETRAACETYL RIBONIC ACID NITRILE

Max Tishler, Rahway, N. J., and John W. Wellman, Cleveland Heights, Ohio, assignors to Merck & Co., Inc., Rahway, N. J., a corporation of New Jersey No Drawing. Application May 24, 1941, Serial No. 395,096

1 Claim. (Cl. 260—464)

This invention relates to tetraacyl pentonic acid nitriles, and to processes of preparing the same, and is a continuation-in-part of our copending application Serial No. 325,182 filed March 21, 1940.

We have discovered that tetraacyl pentonic acid amides react with phosphorus oxychloride to give excellent yields of the corresponding nitriles. The reaction is best carried out by heating with $POCl_3$ at up to about 80° C. until a darkening of the reaction mixture occurs (about one hour), or by use of an inert solvent, such as chloroform, ethylene dichloride, etc., and about 80% to 90% yield of tetraacyl pentonic acid nitrile is obtained.

The following examples illustrate methods of carrying out the present invention, but it is to be understood that these examples are given by way of illustration and not of limitation.

Example I

Five grams of tetraacetyl ribonamide in 15 cc. of phosphorus oxychloride are warmed to 70–80° C. for 30 minutes, during which time the amide dissolves, and hydrogen chloride is evolved copiously. When the solution becomes slightly pink (in about another 15 minutes of heating), heating is stopped, and the solution is allowed to stand at room temperature overnight. The solution is concentrated to dryness under reduced pressure. The residue is dissolved in chloroform, and the chloroform solution is washed four times with ice water. After drying the chloroform solution with sodium sulfate and noriting, it is concentrated to an oil, which is then dissolved in ether. The tetraacetyl ribonic acid nitrile separates as large cubes melting at 72° C., and is substantially pure.

The reaction may be carried out in the presence of an inert solvent, such as ethylene dichloride, by refluxing for about three hours, and isolating in the manner described above.

Example II

Ten grams of tetraacetyl arabonic amide in 30 cc. of phosphorus oxychloride are heated for about one-half hour at 78–80° C., at which point a darkening of color begins. The reaction mixture is concentrated to dryness under reduced pressure, and the tetraacetyl arabonic acid nitrile is recovered as in Example I. Yield, 9 gms.

Other tetraacetyl pentonic acid nitriles may be obtained by employing different aliphatic or aromatic acyl pentonic acid amides as starting materials.

Modifications may be made in carrying out the present invention without departing from the spirit and scope thereof and we are to be limited only by the appended claim.

We claim:

Tetraacetyl ribonic acid nitrile.

MAX TISHLER.
JOHN W. WELLMAN.